Figure 1:
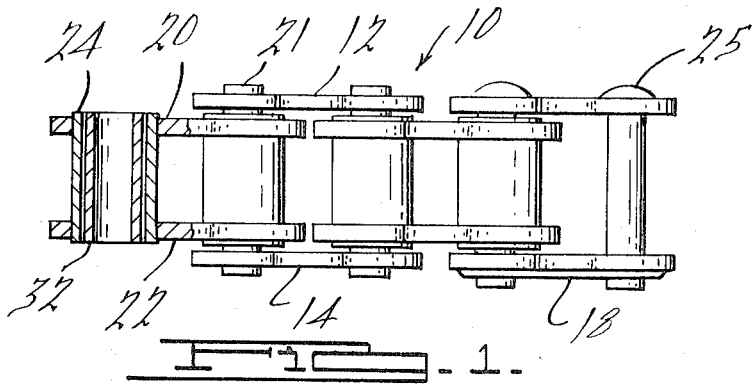

United States Patent
Paul

[15] 3,643,517
[45] Feb. 22, 1972

[54] POWER TRANSMITTING CHAIN WITH FLOATING BUSHING AND METHOD OF MANUFACTURE

[72] Inventor: William T. Paul, Holyoke, Mass.
[73] Assignee: North American Rockwell Corporation, Pittsburgh, Pa.
[22] Filed: Oct. 29, 1970
[21] Appl. No.: 85,053

[52] U.S. Cl. ........................................... 74/254, 74/258
[51] Int. Cl. ..................................................... F16g 13/02
[58] Field of Search ......................... 74/254, 258, 255 R

[56] References Cited

UNITED STATES PATENTS

| 617,716 | 1/1899 | Caldwell | 74/258 |
| 1,121,053 | 12/1914 | Terry | 74/258 |
| 2,775,156 | 12/1956 | Imse et al. | 74/254 X |

*Primary Examiner*—Leonard H. Gerin
*Attorney*—John R. Bronaugh, Floyd S. Levison, E. Dennis O'Connor and Richard A. Speer

[57] ABSTRACT

At least one floating metallic bushing acts as an intermediate bearing member between roller link subassemblies and link pin subassemblies of a power chain. At least one master connection link is held in place by means of a readily disconnectable spring clip. Manufacturing steps include placing a roller link subassembly over open link pin ends of adjacent link pin subassemblies, inserting at least one metallic floating bushing over each pin end and closing each link pin subassembly by fixing link pin members on the open link pin ends of each link pin subassembly.

7 Claims, 5 Drawing Figures

PATENTED FEB 22 1972 3,643,517

INVENTOR.
William T. Paul

POWER TRANSMITTING CHAIN WITH FLOATING BUSHING AND METHOD OF MANUFACTURE

BACKGROUND OF THE INVENTION

This invention relates to improvements in power transmitting chains and particularly to an improved floating bushing used as an intermediate bearing member between a roller link unit and a link pin unit. Power transmitting chains are commonly driven by toothed sprocket wheels and are used in many heavy industrial applications. A typical application is their use as the power takeoff chain of agricultural equipment. Another common application is the use of power transmitting chains in the power train of chain conveyors. Often, power transmitting chains have readily disconnectable master link units to enable chain disconnection for chain-shortening or repair purposes.

This invention further relates to a method of manufacturing a power transmitting chain containing master link units and intermediate floating bushings.

DESCRIPTION OF THE PRIOR ART

The use of a floating bushing as an intermediate bearing member between a roller bushing link subassembly and a link pin subassembly to reduce excessive interlink friction is known in the prior art. Previous prior art teachings sought to take advantage of the self-lubrication properties of solid plastic floating bushings having generally low friction surfaces such as a Teflon (polytetrafluoroethylene) bushing. However, the use of plastic floating bushings are totally unsuited for certain power chain applications. For example, plastic bushings cannot be used where the power chain is subjected to the high temperatures and heavy loads found in a chain driven conveyor kiln environment. Another major disadvantage which is an object of this invention to overcome is the premature failure of the plastic bushing under load. This breakdown of the bushing under load takes several forms. Heat generated by articulation of the fixed roller bushing with respect to the outer surface of the plastic floating bushing and by the articulation of the link pin with respect to the inner surface of the plastic bushing increases as load increases. The nonmetallic bushing under such heat and pressure has a tendency to deform when subjected to prolonged use and to extrude out of the roller bushing in which it is seated. The fatigue strength of the nonmetallic floating bushing presents a limitation to its useful life in most power and in particular in heavy load transmitting chains. Further, lateral flexing pressures of the chain can cause the chain to twist under the tensions produced, thereby deforming the nonmetallic floating bushing. This creates deleterious looseness and/or binding of the roller link subassemblies and the link pin subassemblies. This breakdown of the prior art nonmetallic bushing causes chain elongation which leads to chain repair or replacement. Undesirable down time of expensive equipment to effect chain repair is another problem of which it is an object of this invention to minimize.

SUMMARY OF THE INVENTION

This invention provides for an improved floating bushing in the form of a metallic bushing. A major advantage of the metallic bushing is that it is directed towards reducing the relative motion between the roller link subassembly and the pin link subassembly, thereby lessening the frictional heat generated by articulation and reducing the wear of the surfaces in contact. The prior art nonmetallic bushing was directed towards friction reduction by having a plastic self-lubricating material between the pin and fixed bushing.

Another major advantage is that the metallic bushing has increased wear life and reliability compared to the nonmetallic bushing.

Another major advantage is that the metallic bushing has greater fatigue resistance, dimensional stability under load and adverse environmental conditions than the nonmetallic bushing. This invention further contemplates the use of plural floating metallic bushings in which reduction of the relative motion between mating parts during joint articulation is accomplished by the use of a floating metallic bushing being mounted within a second floating bushing. This invention also contemplates the use of plural floating metallic bushings coaxially aligned in a train so as to abut each other.

It is another object of this invention to provide a readily detachable master link connection. Master links are commonly placed on power transmitting chains to enable chain connection and disconnection to aid in chain repair or in changing a chain length. Quick connection or disconnection is accomplished by means of a spring clip abutting an outer side of a pin link member.

In another embodiment it is contemplated that a floating metallic bushing may be coated on either or both its inner and outer surface with a thin plastic coating. This laminated floating bushing combines self-lubrication with greater deformation resistance than the all-plastic floating bushing.

This invention further relates to a method of manufacturing a power transmission chain using metallic floating bushings, said method comprising the steps of forming roller link subassemblies, as for example, by press fitting the ends of two roller bushings into two spaced roller link plates having pitch holes therefor, forming link pin subassemblies, as for example, by press fitting a link pin into each pitch hole of a two pitch hole link member, placing a first roller link subassembly over one link pin and a second roller link subassembly over the other pin, and then inserting an intermediate bearing member, such as floating metallic bushing, into each of the roller bushings, and then closing the link pin subassembly by placing a top two pitch hole link member over both exposed link pin ends to thereby limit axial movement of the roller link subassemblies.

Figure 2:
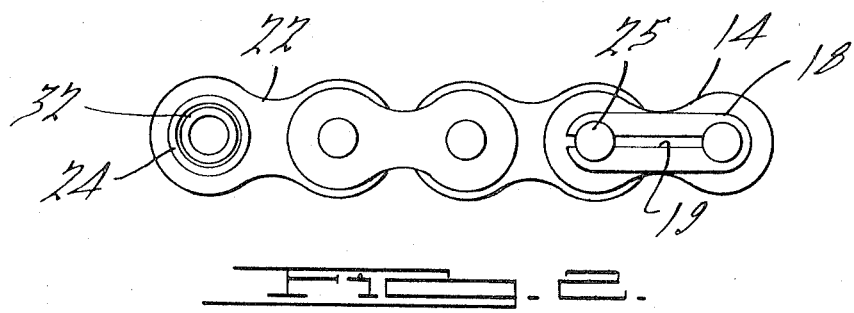
Figure 3:
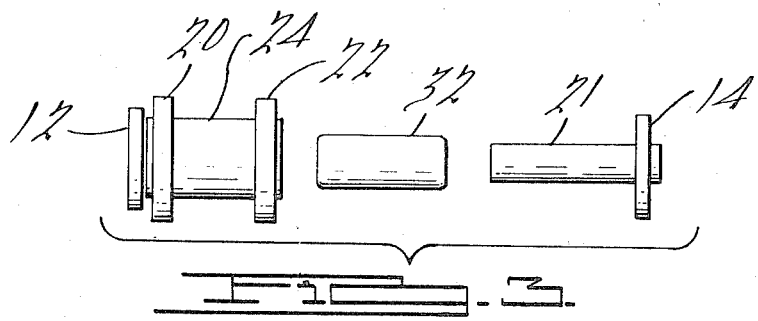
Figure 4:
Figure 5:
Figure 5:
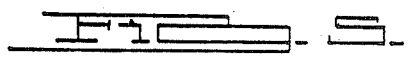

Other features of the invention will become apparent from the following more detailed description and from the accompanying drawing, in which:

FIG. 1 is a plan view of a roller chain in partial section;
FIG. 2 is a side view of the chain of FIG. 1;
FIG. 3 is an exploded end view of the chain of FIG. 1;
FIG. 4 is a sectional view of a modified form of floating metallic bushing taken on the line A—A of FIG. 1 looking in the direction indicated by the arrows; and
FIG. 5 is an end view of connection pin 25.

Referring now to the drawings, and in particular to FIGS. 1–3, there is illustrated a length of power transmitting chain 10 which can be driven by toothed drive sprocket wheels (not shown). Such sprocket wheels are commonly used with various power takeoff machinery drives. Power transmission chain 10 is composed of a series of roller link units or subassemblies interconnected by link pin units or subassemblies. Each roller link subassembly comprises two spaced apart roller bushings 24 connected by inner roller link members 20 and 22. These bushings 24 are fixedly attached into pitch holes extending through the inner roller link members 20 and 22 as by a press fit. Both the roller bushings and the roller link members can be made of a suitable grade of steel.

Two spaced standard rivet-type link pins 21 are fixedly attached near their ends to outer pin link members 12 and 14 as by a press fit. At least one intermediate bearing member in the form of floating metallic bushing 32 is placed in each roller bushing 24 and in coaxial relationship to a link pin 21. Floating metallic bushing 32 is placed in each roller bushing prior to closing the link pin subassembly.

As best viewed in FIGS. 1 and 2, a master connection link is formed by holding outer pin link members between the inner surface of the heads of connection pins 25 and a spring clip 18. The outer pin link members are the same as the outer pin link members 12 and 14 held by link pins 21. Connection pin 25 is normally fixedly attached with respect to the outer pin link members as by press fitting. However, connection pin 25 could also be mounted so as to freely rotate with respect to the outer pin link members. As shown in FIG. 5, the end opposite the head end of connection pin 25 has a grooved recess 26. Spring clip 18 has an inner slot portion 19 (FIG. 2) which engages a grooved recess 26 at each slot end. One end of the spring clip 18 is split to allow fitting of the spring clip over the connection pin ends. Such master link units are used to allow quick chain disconnection to effect chain repair, replacement of subassembly units or changes in chain length. Two spring clips 18 could be used in place of a single clip and two connection pin heads by having a grooved recess 26 adjacent each pin end.

The selection of the metal to be used in the metallic bushing 32 depends on a variety of factors. Major criteria to be considered would include the chain's environment of use, i.e., temperature and load conditions and cost differences in manufacture. The proper selection of the metal is largely dependent on the particular application.

Floating bushing 32 can be made of a suitable steel, such as plain steel, carbon steel or a stainless steel. A carburized and hardened steel can also be used. In a preferred embodiment, shown in FIGS. 1-3, bushing 32 can be made of a stainless steel in the 300 series or the 400 series. The 300 series is preferred in applications calling for high temperatures and/or corrosion resistance. The 400 series is heat treatable and is preferred in applications calling for greater strength than the 300 series. A more expensive and stronger stainless steel, such as the precipitation hardening 17-4 and 17-7 family may be used in power transmission chains requiring unusual resistance to heat, corrosion and high work load conditions. Typical applications would be in such environments as conveyor chain drives in bakeries and metal heat-treating kilns. Particularly corrosive conditions are often present in oil and water quenching kilns.

It is contemplated that other high-strength metals and metal alloys could also be employed as the floating bushing material.

It is further contemplated in another embodiment that more than one metallic floating bushing could be provided depending upon various factors such as size of the chain and load conditions.

One form of plural floating bushings would have one floating bushing mounted within a second floating bushing so as to be in a coaxial concentric relationship to each other. The innermost floating bushing could be seated on a link pin 21 and inserted into the outermost floating bushing seated within a fixed roller bushing 24. Although more costly than a single floating bushing, double floating bushings would achieve greater reduction in internal friction generated by articulation of the roller link subassembly and the pin link subassembly.

Another form of plural floating bushings would be to align two or more of them in coaxial train relationship within a single roller bushing 24.

It is also possible to use a sintered metallic bushing which has the advantage of providing a self-lubricating effect while still capable of use in applications not contemplated by the prior art plastic bushings. Floating bushings 32 can also be made of cast iron to take advantage of the self-lubricating qualities of the higher carbon content of such irons.

A severe limitation to the known all-plastic bushing is its tendency to deform and extrude under operational loading pressures. The FIG. 4 embodiment illustrates a laminated floating bushing characterized by the fact that the core portion 34 is metallic while the surface portions 33 and 35 are thin bonded layers of plastic known to have good self-lubricating properties, such as vinyl, nylon, Teflon or silicone. Both Teflon and silicon have the added advantage of having low coefficients of friction. The laminated floating bushing thus combines the strength of a metallic core with the self-lubrication qualities of plastic films. The thin bonded plastic layer will not extrude and deform under the pressure loads at which the conventional solid plastic bushing fails. It is also possible to bond only one surface of the metallic core.

The process manufacturing the previously described power transmitting chain involves the following steps: An integral fixed roller link subassembly is prepared by fixedly attaching two roller bushings 24 into the pitch holes of spaced apart inner roller link members 20 and 22. A plurality of these roller link subassemblies are thus made up in this manner. Both floating bushings 32 and roller bushings 24 can be formed into their cylindrical hollow shapes by curling flat sheets or strips of steel into tubular form and then cutting for length size. It should be understood that both bushings can also be formed by other conventional methods of making bushings, as for example, by extrusion processes. Two standard rivet type link pins 21 are fixedly attached to pitch holes provided in bottom outer pin link member 14, as by a press fit. One roller link subassembly is then placed over one of the link pins 21 while a second roller link subassembly identical to the first is placed over the outer link pin 21. The roller link subassemblies can be placed either sequentially or simultaneously. At least one floating bushing 32 is then placed inside of the roller bushings 24 having link pins 21 extending therethrough. It is also possible to place the floating bushings 32 on the link pins 21 before placing the fixed roller bushing subassemblies. The linking of the roller link subassemblies is then completed by fixedly attaching, as by press fitting, a top outer pin link member 12 having pitch holes identical to those of bottom outer pin link member 14 to the free ends of link pins 21. Axial movement of the roller bushing and the floating bushing is thus limited. If a master link is desired, then connection pins 25 are used in place of link pins 21. After the top outer pin link member is placed over the connection pins a spring clip 18 having an inner slot portion 19 split at one end is inserted into alignment with grooved recesses 26 provided on each connection pin.

Having thus described the invention in rather complete detail, it will be understood that these details need not be strictly adhered to and that various changes and modifications may be made, all falling within the scope of the invention as defined by the following claims.

I claim:

1. A method of manufacturing a power transmitting chain link assembly comprising:
   a. fixedly attaching a roller bushing into each pitch hole of a two pitch hole first roller link member;
   b. fixedly attaching a two pitch hole roller link member over said roller bushings in spaced substantially parallel relationship to said first roller link member, thereby forming a first roller link subassembly;
   c. forming a second roller link subassembly in the manner set forth above;
   d. fastening a link pin into each pitch hold of a bottom two pitch hole pin link member;
   e. placing said first roller link subassembly over one of said link pins such that said link pin extends through one of the roller bushings of said first roller ink subassembly;
   f. placing said second roller link subassembly over the other of said link pins such that said other link pin extends through one of the roller bushings of the second roller link subassembly;
   g. inserting at least one floating bushing over each of said link pins such that each floating bushing is coaxially seated with respect to one of said roller bushings;
   h. placing a top pin member having two pitch holes over the tops of said link pins thereby linking said first and second roller link subassemblies; and
   i. retaining said top pin link member on the said link pins thereby limiting axial displacement of the roller link subassemblies.

2. A power transmitting chain link assembly comprising a combination of interconnected roller link subassemblies and pin link subassemblies; wherein each of said roller link subassemblies comprises a pair of spaced apart inner roller link members, roller bushings and at least one floating metallic bushing mounted within each of said roller bushings, said roller link members having pitch holes adjacent their ends which receive said roller bushings thereby holding them in spaced relationship;

each of said pin link subassemblies having a pair of pin link members spaced outwardly of said inner roller link members and pins attached to the ends of said pin link members to form an integral pin link subassembly; each of said pins interconnecting adjacent roller link subassemblies by passing through at least one of said metallic floating bushings thereby allowing said floating bushings to rotate with relation to said pins.

3. The power transmitting chain link assembly according to claim 2 wherein said pins are fixedly attached to the ends of said pin link members.

4. The power transmitting chain link assembly according to claim 2 wherein at least one of said pin link members is attached to said pins by spring clip means.

5. The power transmitting chain link assembly according to claim 2 wherein said floating metallic bushing has at least one bearing surface coated with a thin self-lubricating plastic film.

6. The power transmitting chain link assembly according to claim 2 wherein said floating metallic bushing has self-lubricating sintered metallic surfaces.

7. The power transmitting chain link assembly according to claim 4 wherein each of said pins has at least one recessed groove adjacent an end, said spring clip means engaging said recessed groove of each pin.

* * * * *

PO-1050
(5/69)

UNITED STATES PATENT OFFICE
CERTIFICATE OF CORRECTION

Patent No. 3,643,517      Dated February 22, 1972

Inventor(s) WILLIAM T. PAUL

It is certified that error appears in the above-identified patent and that said Letters Patent are hereby corrected as shown below:

Column 4, Claim 1, line 44, change "hold" to read "hole"

line 48, change "ink" to read "link"

line 56, after "pin" insert ---link---.

Signed and sealed this 30th day of January 1973.

(SEAL)
Attest:

EDWARD M. FLETCHER, JR.            ROBERT GOTTSCHALK
Attesting Officer                    Commissioner of Patents